(12) United States Patent
Orita

(10) Patent No.: US 10,471,455 B2
(45) Date of Patent: Nov. 12, 2019

(54) DRIVE DEVICE AND SPRAY DEVICE USING SAID DRIVE DEVICE

(71) Applicant: SUMITOMO CHEMICAL COMPANY, LIMITED, Tokyo (JP)

(72) Inventor: Tuyoshi Orita, Takarazuka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 25 days.

(21) Appl. No.: 15/771,970

(22) PCT Filed: Nov. 2, 2016

(86) PCT No.: PCT/JP2016/082680
§ 371 (c)(1),
(2) Date: Apr. 27, 2018

(87) PCT Pub. No.: WO2017/078102
PCT Pub. Date: May 11, 2017

(65) Prior Publication Data
US 2018/0250696 A1    Sep. 6, 2018

(30) Foreign Application Priority Data

Nov. 4, 2015  (JP) ................. 2015-216612

(51) Int. Cl.
*B05B 12/08*    (2006.01)
*A01M 7/00*    (2006.01)
*G01V 8/12*    (2006.01)

(52) U.S. Cl.
CPC .............. *B05B 12/08* (2013.01); *A01M 7/00* (2013.01); *G01V 8/12* (2013.01); *A01M 7/0021* (2013.01);
(Continued)

(58) Field of Classification Search
CPC ..... B05B 12/08; A01M 7/00; A01M 2200/01; A01M 7/0089; A01M 7/0021; G01V 8/12
(Continued)

(56) References Cited

U.S. PATENT DOCUMENTS 6,369,688 B1    4/2002  Abe et al.
6,755,031 B2    6/2004  Cho et al.
(Continued)

FOREIGN PATENT DOCUMENTS

CN    1475764 A    2/2004
JP    2-009891 U    1/1990
(Continued)

OTHER PUBLICATIONS

International Preliminary Report on Patentability issued in corresponding International Application No. PCT/JP2016/082680 dated May 17, 2018, with English language translation.
(Continued)

*Primary Examiner* — Robert E Fennema
*Assistant Examiner* — Jigneshkumar C Patel
(74) *Attorney, Agent, or Firm* — Birch, Stewart, Kolasch & Birch, LLP

(57) ABSTRACT

A drive device in which a controller includes a detection determiner, a high threshold that is initially set and a low threshold are switchably set in the detection determiner as thresholds for determining whether or not to capture detection signals, the controller performs: when the detection determiner makes a capture determination before drive processing, low-switching processing to switch the threshold from the high threshold to the low threshold before the drive processing is started based on the determination results; and perform drive cancellation processing to cancel driving of a driver when the detection determiner makes a capture determination after the low-switching processing.

5 Claims, 4 Drawing Sheets

(52) U.S. Cl.
CPC ....... *A01M 7/0089* (2013.01); *A01M 2200/01* (2013.01)

(58) Field of Classification Search
USPC .......................................................... 700/283
See application file for complete search history.

(56) References Cited

U.S. PATENT DOCUMENTS

| | | | |
|---|---|---|---|
| 7,893,829 | B2 | 2/2011 | Sipinski et al. |
| 9,598,846 | B2 | 3/2017 | Shirai et al. |
| 2004/0031274 | A1 | 2/2004 | Cho et al. |
| 2009/0309717 | A1 | 12/2009 | Sipinski et al. |
| 2010/0193599 | A1* | 8/2010 | Butler ................. A01M 1/2038 239/1 |
| 2010/0243673 | A1* | 9/2010 | Furner ................. B65D 83/262 222/1 |
| 2015/0259890 | A1* | 9/2015 | Shirai .................... E03C 1/057 4/668 |
| 2016/0201306 | A1 | 7/2016 | Shirai et al. |

FOREIGN PATENT DOCUMENTS

| | | |
|---|---|---|
| JP | 6-003366 A | 1/1994 |
| JP | 6-170286 A | 6/1994 |
| JP | 8-261835 A | 10/1996 |
| JP | 9-138284 A | 5/1997 |
| JP | 2000-357443 A | 12/2000 |
| JP | 2004-77462 A | 3/2004 |
| JP | 2010-167187 A | 8/2010 |
| JP | 2011-27645 A | 2/2011 |
| JP | 2012-145545 A | 8/2012 |
| JP | 2014-123982 A | 7/2014 |
| JP | 2015-068120 A | 4/2015 |

OTHER PUBLICATIONS

International Preliminary Report on Patentability and Written Opinion of the International Searching Authority (Forms PCT/IB/338, PCT/IB/326, PCT/IB/373 and PCT/ISA/237) for Application No. PCT/JP2016/082679, dated May 17, 2018, with English translation.
International Search Report and English translation (Form PCT/ISA/210) for Application No. PCT/JP2016/082679, dated Jan. 24, 2017, with English translation.
International Search Report (PCT/ISA/210) issued in PCT/JP2016/082680, dated Jan. 17, 2017.
Chinese Office Action for Chinese Application No. 201680062601.2, dated Jun. 6, 2019.

* cited by examiner

DRIVE DEVICE AND SPRAY DEVICE USING SAID DRIVE DEVICE

CROSS-REFERENCE TO RELATED APPLICATION

This application claims priority to Japanese Patent Application No. 2015-216612, filed on Nov. 4, 2015, the disclosure of which is incorporated herein by reference in its entirety.

FIELD

The present invention relates to a drive device configured to control a driver based on detection results of a detector configured to detect moving bodies, and to a spray device using the drive device.

BACKGROUND

Conventionally, as such a spray device, there is known a spray device including: a spreader capable of spreading a drug by spraying or the like; a spreader controller configured to actuate the spreader; a human detector configured to detect the presence or absence of a person in the spreading space; and a spread delay generator configured to delay start of the spreading, in the case where the presence of a person is detected by the human detector at the spreading start time, until the absence of the person is detected.

Since the spray device includes the spread delay generator, it can ensure high safety of outsiders or the like who have accidentally entered the spreading space at the spreading start time and can perform spreading, as expected, after the outsiders or the like have left there (for example, Patent Literature 1).

CITATION LIST

Patent Literature

Patent Literature 1: JP H6-170286 A

In such a spray device as described above in which whether or not to perform spreading is controlled depending on the presence or absence of a person, the reliability of the spreading operation varies depending on how to capture the detection signals from the human detector and perform the control. However, in the conventional spray device, whether the detection signals from the human detector are widely captured or restrictively captured is not considered at all, and there is room for improvement.

For example, in the conventional spray device, in the case where the detection signals from the human detector are widely captured for the control, the spreading may be unnecessarily delayed by detection of a person who does not actually need to be detected.

Meanwhile, in the case where the detection signals from the human detector are restrictively captured for the control, the spreading may be performed by failing to detect a person who should be actually detected.

The room for improvement exists not only in such spray devices, but also generally in drive devices that are configured to control and drive a driver such as the spreader based on the detection results of a detector that is configured to detect moving bodies such as humans.

SUMMARY

Technical Problem

In view of such an actual situation, it is an object of the present invention to provide a drive device capable of improving the reliability of driving by reducing unnecessary driving cancellation and performing necessary driving without failure, and a spray device using the drive device.

Solution to Problem

A drive device according to the present invention includes: a driver; a detector configured to detect a moving body; and a controller configured to control the driver based on detection results of the detector, wherein the controller includes a detection determiner configured to determine whether or not to capture detection signals from the detector, a high threshold that is initially set and a low threshold that is lower than the high threshold are switchably set in the detection determiner as thresholds for determining whether or not to capture the detection signals, the controller is configured to: perform drive processing to drive the driver and drive cancellation processing to cancel the driving of the driver; perform, when the detection determiner makes a capture determination to determine the capture of the detection signals before executing the drive processing, low-switching processing to switch the threshold of the detection determiner from the high threshold to the low threshold before start of the drive processing based on the determination results; and perform, when the detection determiner makes a capture determination after execution of the low-switching processing, the drive cancellation processing based on the determination results.

According to an aspect of the present invention, the controller may be configured to: periodically perform the drive processing; perform the drive cancellation processing on a first driving of the driver after the low-switching processing based on the determination results of the capture determination made by the detection determiner after the execution of the low-switching processing; and perform high-switching processing to switch the threshold of the detection determiner from the low threshold to the high threshold after the drive cancellation processing.

According to another aspect of the present invention, the controller may be configured to perform the low-switching processing a specific time before the start of the drive processing and after the capture determination of the detection determiner in which the high threshold is set.

According to another aspect of the present invention, the controller may be configured to: prepare for the low-switching processing in a case where the detection determiner makes a capture determination before executing the drive processing; and perform the drive cancellation processing in a case where the detection determiner further makes a capture determination during the time from the preparation to the low-switching processing.

A spray device according to the present invention uses the drive device described above, wherein the driver is a spray configured to spray a spray material.

According to an aspect of the present invention, a spray area of the spray and a detection area of the detector may be configured to overlap each other.

DESCRIPTION OF EMBODIMENTS

Hereinafter, a spray device using a drive device according to the present invention will be described with reference to the drawings.

Figure 1:
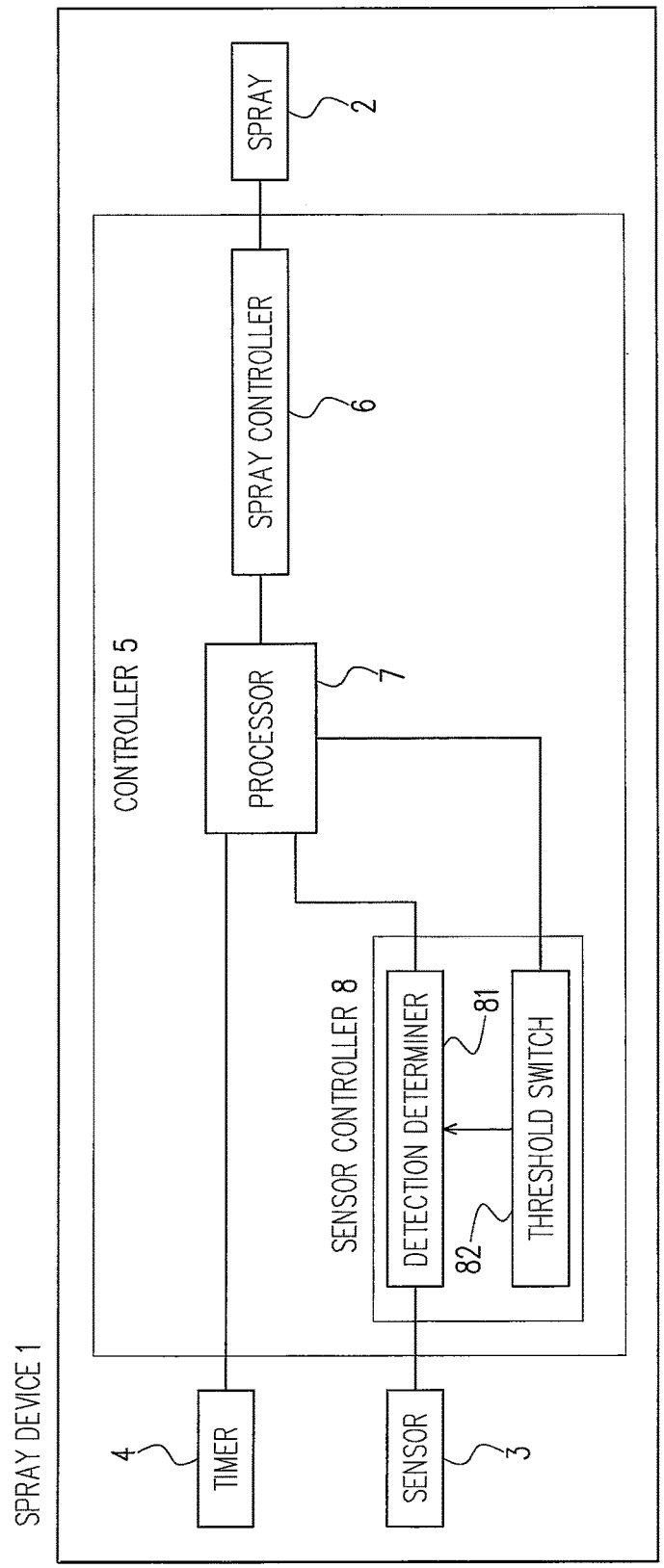
FIG. 1 is a configuration diagram of a spray device according to an embodiment of the present invention.
Figure 2:
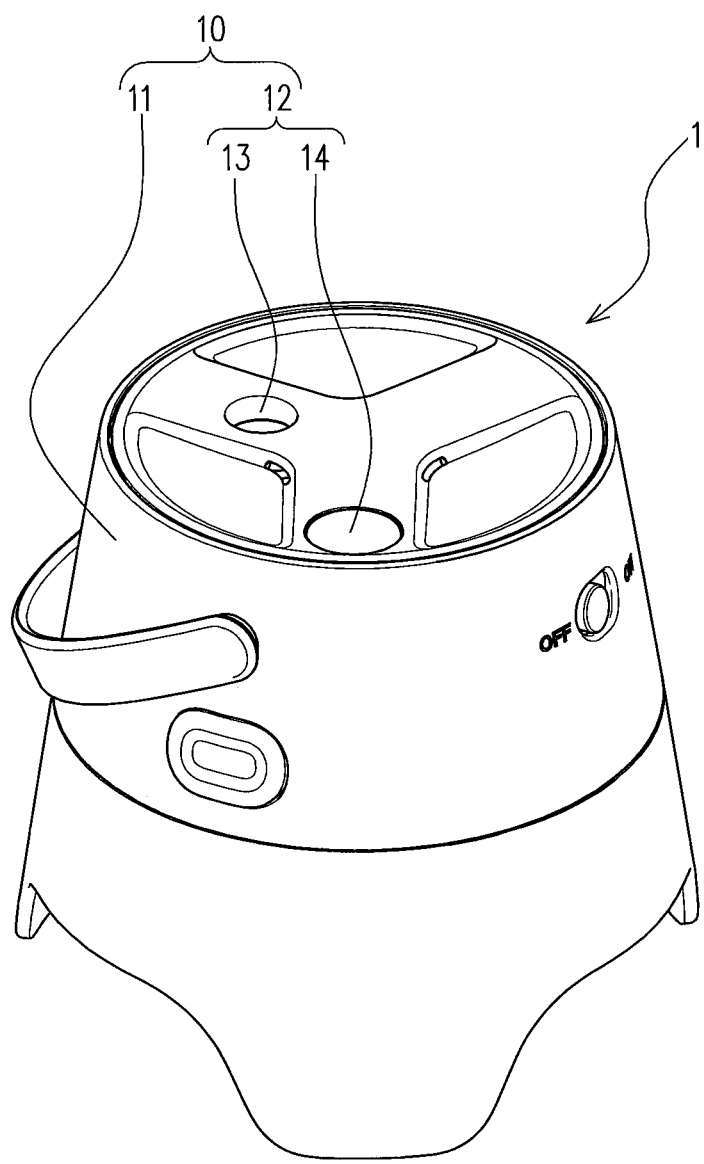
FIG. 2 is a perspective view of the spray device according to the aforementioned embodiment.
Figure 3:
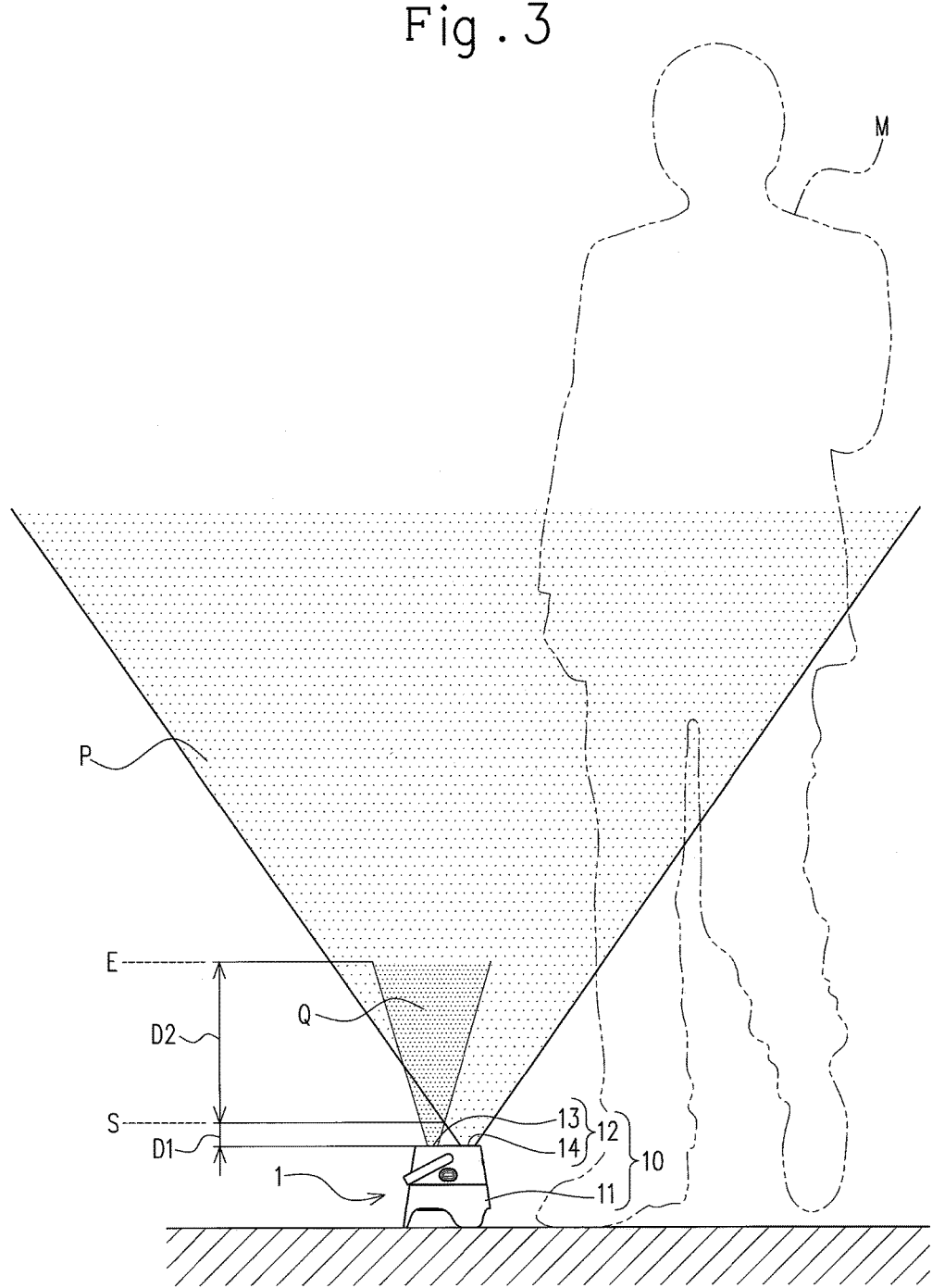
FIG. 3 is a view for schematically explaining how a spray area and a detection area of the spray device according to the aforementioned embodiment expand.

The spray device of this embodiment is controlled to periodically perform spraying. In this embodiment, the spray device is controlled to perform spraying for 0.1 to 2 seconds every 30 seconds. As shown in FIG. 1 to FIG. 3, a spray device 1 includes a spray 2 as a driver configured to spray a spray material, a detector 3 configured to detect a moving body M, a timer 4 configured to measure time, a controller 5 configured to control the spray 2 based on the detection results of the detector 3, and a body 10 in which a spray opening 13 that forms a spray area Q and a detector opening 14 that forms a detection area P are formed.

The spray 2 performs operations such as start and stop of spraying based on information from the controller 5. The spray 2 is configured to form the spray area Q outside the spray device 1. The spray area Q is an area in which the spray material is spread. The spray material is a material that is sprayed from the spray 2 such as materials having fluidity, e.g., gases and liquids, particulate materials, or the like. In the spray device 1 of this embodiment, a liquid drug having an insecticidal effect is used as the spray material.

As shown in FIG. 3, the spray area Q radially expands from the spray opening 13 outwardly of the spray device 1. The spray device 1 of this embodiment is controlled so that the spray material expands to the spray area Q formed with a spray height of 10 cm to 40 cm and a spray angle of 10 degrees to 20 degrees.

The detector 3 generates detection signals upon detecting the moving body M. The detector 3 of this embodiment is a sensor. Specifically, the detector 3 is a pyroelectric sensor. That is, the detector 3 is configured to generate electric signals as the detection signals by receiving infrared rays emitted from the moving body M. Though not shown, the detector 3 includes a detector body provided with a pyroelectric element, an amplifier circuit configured to amplify the electric signals from the pyroelectric element, and a filter circuit configured to output desired electric signals out of the amplified electric signals. The filter circuit outputs the electric signals to the controller 5. Hereinafter, the detector 3 is referred to as a sensor 3.

As shown in FIG. 3, the sensor 3 (not shown) forms the detection area P outside the spray device 1. The detection area P is an area in which the moving body M is detected. The detection area P radially expands from the detector opening 14 outwardly of the spray device 1. The spray device 1 of this embodiment is controlled so that the detection area P expands to a detection distance (detection height) of about 90 cm and a detection angle of about 70 degrees.

The spray area Q and the detection area P are configured to overlap each other. The spray area Q and the detection area P expand (extend) in the same direction, outwardly of the spray device 1. Specifically, the spray opening 13 and the detector opening 14 are formed adjacent to each other in a cover 12, which will be described below, and pass through the cover 12 in the thickness direction. The spray area Q expands upwardly of the spray device 1 via the spray opening 13. Further, the detection area P expands upwardly of the spray device 1 via the detector opening 14. The spray area Q and the detection area P overlap each other above the spray device 1. In this embodiment, the detection area P extends upwardly higher than the spray area Q and expands so that the end edge of the detection area P is located outside the end edge of the spray area Q at the top of the detection area P. Further, a distance D1 from the cover 12 to a start point S of the overlapping of the spray area Q and the detection area P is shorter than a distance D2 from the start point S to an endpoint E of the overlapping of the spray area Q and the detection area P.

The timer 4 is configured to start or end measuring the time based on information from the controller 5. The controller 5 is configured to repeat spray processing as drive processing to drive the spray 2 or spray cancellation processing as drive cancellation processing to cancel the driving of the spray 2, and the timer 4 measures the time from the start of the control by the controller 5 such as the time from the preceding spray processing (or spray cancellation processing) to the next spray processing (or spray cancellation processing). In this embodiment, the timer 4 measures the time from when the preparation of the control by the controller 5 has been completed upon turning on the power source of the spray device 1. The timer 4 ends the time measurement when the power source of the spray device 1 is turned off.

The timing at which the timer 4 starts the time measurement will be described. In the case where the preceding control has been ended with spray processing (that is, in the case where the spraying has been carried out), the timer 4 starts the time measurement from when the spraying is stopped, that is, when the spraying is ended. In the case where the preceding control has been ended with the spray cancellation processing (that is, in the case where the scheduled spraying has not been carried out), the timer 4 starts the time measurement from the scheduled time to start spraying at which the spraying has been scheduled to start.

The timing at which the timer 4 that has started the time measurement ends the time measurement will be described. In the case where the control ends with spray processing during the measurement, the timer 4 ends the time measurement while the spraying is stopped. Further, in the case where the control ends with the spray cancellation processing during the measurement, the timer 4 ends the time measurement at the scheduled time to start spraying. That is, in the case where the control ends with the spray cancellation processing, the control ends at the scheduled time to start spraying without performing spraying at the scheduled time to start spraying. Further, the timer 4 is configured to reset the measured time based on information from the controller 5.

As shown in FIG. 1, the controller 5 includes a spray controller 6 configured to control the spraying of the spray 2, a sensor controller 8 configured to determine whether or not the moving body M is detected, and a processor 7 configured to control whether spray processing or spray cancellation processing is performed. The controller 5 of this embodiment is configured to periodically perform the spray processing of the spray 2. The controller 5 of this embodiment is arranged within a microcomputer and controls the spray 2.

The spray controller 6 controls the spraying of the spray 2 based on information from the processor 7. The spray controller 6 outputs, to the spray 2, spray start signals for starting the spraying, spray stop signals for stopping the started spraying, and spray cancellation signals for cancelling the spraying so that the spraying is not started. The spray controller 6 outputs the spray start signals upon receiving a spray command that is a command from the processor 7 to start the spraying. The spray controller 6 outputs the spray stop signals upon receiving a spray stop command that is a command from the processor 7 to end the spraying. Further, the spray controller 6 outputs the spray cancellation signals upon receiving a spray cancel command from the processor 7 that is a command to cancel the spraying. The spray cancellation signals are output from the spray controller 6, so that the scheduled spraying is cancelled, and the spraying is not started.

The sensor controller 8 has a detection determiner 81 configured to determine whether or not to capture the detection signals from the sensor 3, and a threshold switch 82 configured to perform threshold switching processing.

In the detection determiner 81, a threshold for determining whether or not to capture the detection signals from the sensor 3 is set. The detection determiner 81 determines whether or not to capture detection signals based on whether or not the detection signals exceed the threshold. Specifically, in the case where the detection signals are higher than the threshold, the detection determiner 81 determines that the detection signals are captured (capture determination), and in the case where the detection signals are equal to or less than the threshold, it determines that the detection signals are not captured (non-capture determination). A high threshold that is initially set and a low threshold that is lower than the high threshold are switchably set as thresholds in the detection determiner 81. When one threshold is switched, the detection determiner 81 determines whether or not to capture detection signals based on the other threshold. The detection determiner 81 is configured to output the determination results to the processor 7.

The spray device 1 is switched between the state of having low sensitivity and the state of having high sensitivity upon switching the detection determiner 81 between the high threshold and the low threshold. Specifically, the sensor 3 is configured to output electric signals as the detection signals when the moving body M moves within the detection area P. The greater the movement of the moving body M, the larger the detection signals output by the sensor 3. Therefore, in the state where a high threshold is set in the detection determiner 81, the detection determiner 81 can capture the detection signals when the movement of the moving body M within the detection area P is great, whereas it is difficult to capture the detection signals when the movement of the moving body M within the detection area P is small. In contrast, in the state where a low threshold is set in the detection determiner 81, it is easy for the detection determiner 81 to capture the detection signals even if the movement of the moving body M within the detection area P is small. In this way, the detection determiner 81 can capture larger detection signals in the state of high sensitivity (low threshold) than in the state of low sensitivity (high threshold).

In this embodiment, a medium threshold that is a threshold between the high threshold and the low threshold, and the high threshold are switchably set in the detection determiner 81.

The threshold switch 82 is configured to switch the threshold of the detection determiner 81 based on information from the processor 7. The threshold switch 82 is configured to perform low-switching processing to switch the threshold of the detection determiner 81 from the high threshold to the low threshold and high-switching processing to switch the threshold of the detection determiner 81 from the low threshold to the high threshold, based on information from the processor 7. In this embodiment, the high-switching processing includes processing to switch the threshold of the detection determiner 81 from the medium threshold to the high threshold. The threshold switch 82 performs the low-switching processing to switch the threshold of the detection determiner 81 from the high threshold to the low threshold upon receiving, from the processor 7, a low-switching command that is a command to switch the threshold from the high threshold to the low threshold. Further, the threshold switch 82 performs the high-switching processing to switch the threshold of the detection determiner 81 from the low threshold to the high threshold upon receiving, from the processor 7, a high-switching command that is a command to switch the threshold from the low threshold (medium threshold) to the high threshold.

The threshold switch 82 of this embodiment is configured to perform medium-switching processing to switch the threshold of the detection determiner 81 from the high threshold to the medium threshold based on information from the processor 7. The threshold switch 82 performs the medium-switching processing to switch the threshold of the detection determiner 81 from the high threshold to the medium threshold upon receiving, from the processor 7, a medium-switching command that is a command to switch the threshold from the high threshold to the medium threshold. Further, the threshold switch 82 performs high-switching processing to switch the threshold of the detection determiner 81 from the medium threshold to the high threshold upon receiving, from the processor 7, the high-switching command.

The processor 7 outputs, to the timer 4, a measurement start command to start the time measurement, a measurement stop command to end the time measurement, and a reset command to reset the measured time. The processor 7 outputs the measurement start command to the timer 4 when the power source of the spray device 1 is turned on, and the preparation of the control is completed. Then, the processor 7 outputs the reset command after outputting the measurement stop command to the timer 4 when the power source of the spray device 1 is turned off.

In the case where the preceding control ends with the spray processing, the processor 7 outputs the measurement start command, while the spraying is stopped, to start the next (new) control. Then, in the case where the control ends with the spray processing, the processor 7 outputs the measurement stop command, while the spraying is stopped, to end the control. In the case where the control ends with the spray cancellation processing, the processor 7 outputs the measurement stop command at the scheduled time to start spraying, to end the control.

Further, in the case where the preceding control ends with the spray cancellation processing, the processor 7 outputs the measurement start command at the scheduled time to start spraying, to start the next (new) control. Then, in the case where the control ends with spray processing, the processor 7 outputs the measurement stop command, while the spraying is stopped, to end the control. In the case where the control ends with the spray cancellation processing, the processor 7 outputs the measurement stop command at the scheduled time to start spraying, to end the control. The processor 7 outputs the measurement stop command and the reset command to the timer 4 so that the timer 4 can start the time measurement of the next control when the control is ended.

The processor 7 performs the spray processing to cause the spray 2 to perform the spraying and the spray cancellation processing to cancel the scheduled spraying. The processor 7 performs the spray processing or the spray cancellation processing based on information from the timer 4 and the detection determiner 81. The processor 7 outputs the spray command to the spray controller 6 when performing the spray processing. The processor 7 stops the spraying of the spray 2 after a lapse of a specific time (in this embodiment, 0.1 to 2 seconds) from the start of the spraying. That is, the processor 7 determines whether or not the specific time has elapsed from the start of the spraying based on information from the timer 4 and outputs the spray stop command to the spray controller 6 when it is determined that the specific time has elapsed from the start of the spraying. Thus, the spraying is continued for a certain time. Further, the processor 7 outputs the spray cancel command to the spray controller 6 when performing the spray cancellation processing. Further, the processor 7 is configured to output the low-switching command, the high-switching command, or the medium-switching command to the threshold switch 82.

When the detection determiner 81 makes a capture determination based on the high threshold before the spray processing, the processor 7 causes the threshold switch 82 to perform the low-switching processing based on the determination results before starting the spray processing. Thus, the threshold of the detection determiner 81 is switched from the high threshold to the low threshold. When the detection determiner 81 makes a capture determination based on the low threshold after the low-switching processing is performed by the threshold switch 82, the processor 7 performs the spray cancellation processing based on the determination results.

In this embodiment, when the detection determiner 81 makes a capture determination based on the low threshold after the threshold switch 82 has performed the low-switching processing, the processor 7 performs the spray cancellation processing on the first spraying of the spray 2 after the low-switching processing based on the determination results. In this case, the processor 7 causes the threshold switch 82 to perform the high-switching processing after the spray cancellation processing. Thus, the threshold of the detection determiner 81 is switched from the low threshold to the high threshold, and the detection determiner 81 returns to the initial state. Then, the next control is started.

The processor 7 causes the threshold switch 82 to perform the low-switching processing a specific time before the start of the spray processing after the capture determination of the detection determiner 81 in which the high threshold is set (in the initial state). In this embodiment, the processor 7 causes the threshold switch 82 to perform the low-switching processing after the capture determination of the detection determiner 81 in which the high threshold is set so that the period during which the high threshold is set is longer than the period during which the low threshold is set. Specifically, the processor 7 causes the threshold switch 82 to perform the low-switching processing 5 seconds before the start of the spray processing after the capture determination of the detection determiner 81 in which the high threshold is set. That is, when the detection determiner 81 makes a capture determination based on the high threshold before 5 seconds prior to the start of the spray processing, the threshold of the detection determiner 81 is switched from the high threshold to the low threshold before 5 seconds before the start of the spray processing.

The period between spray processing (or spray cancellation processing) and the next spray processing (or spray cancellation processing) includes a high-threshold set period in which the detection determiner 81 makes a capture determination based on the high threshold and a low-threshold set period in which the detection determiner 81 makes a capture determination based on the low threshold. The processor 7 causes the threshold switch 82 to perform the low-switching processing so that the high-threshold set period is longer than the low-threshold set period. In this embodiment, spray processing is performed every 30 seconds, and whether or not to capture detection signals is determined based on the high threshold for 25 seconds after the start of the time measurement by the timer 4. Further, whether or not to capture detection signals is determined based on the low threshold for 5 seconds before the start of the spray processing.

In this embodiment, in the case where the detection determiner 81 makes no capture determination for 25 seconds after the start of the time measurement (that is, in the case where all the determination results of the detection determiner 81 are non-capture determinations), the processor 7 causes the threshold switch 82 to perform the medium-switching processing 5 seconds before the start of the spray processing based on the determination results. Thus, the threshold of the detection determiner 81 is switched from the high threshold to the medium threshold. When the detection determiner 81 makes a capture determination after the threshold switch 82 has performed the medium-switching processing, the processor 7 performs the spray cancellation processing based on the determination results.

In this embodiment, in the case where the detection determiner 81 makes a capture determination based on the high threshold before the spray processing, the processor 7 causes the threshold switch 82 to prepare for the low-switching processing. In the case where the detection determiner 81 further makes a capture determination based on the high threshold after the preparation and before the threshold switch 82 performs the low-switching processing, the processor 7 performs the spray cancellation processing.

The body 10 has a bottomed cylindrical spray body 11 configured to house the spray 2, the sensor 3, the timer 4, and the controller 5, and the cover 12 configured to close the spray body 11. Further, the spray opening 13 and the detector opening 14 are formed in the body 10. The spray body 11 is formed into a cylindrical shape, and the cover 12 is formed into a circular plate shape. The cover 12 is a top plate that covers the entirety of the upper opening of the spray body 11, and the spray opening 13 and the detector opening 14 are formed in the top plate. The cover 12 is provided on the opposite side of the bottom of the spray body 11.

Figure 4:
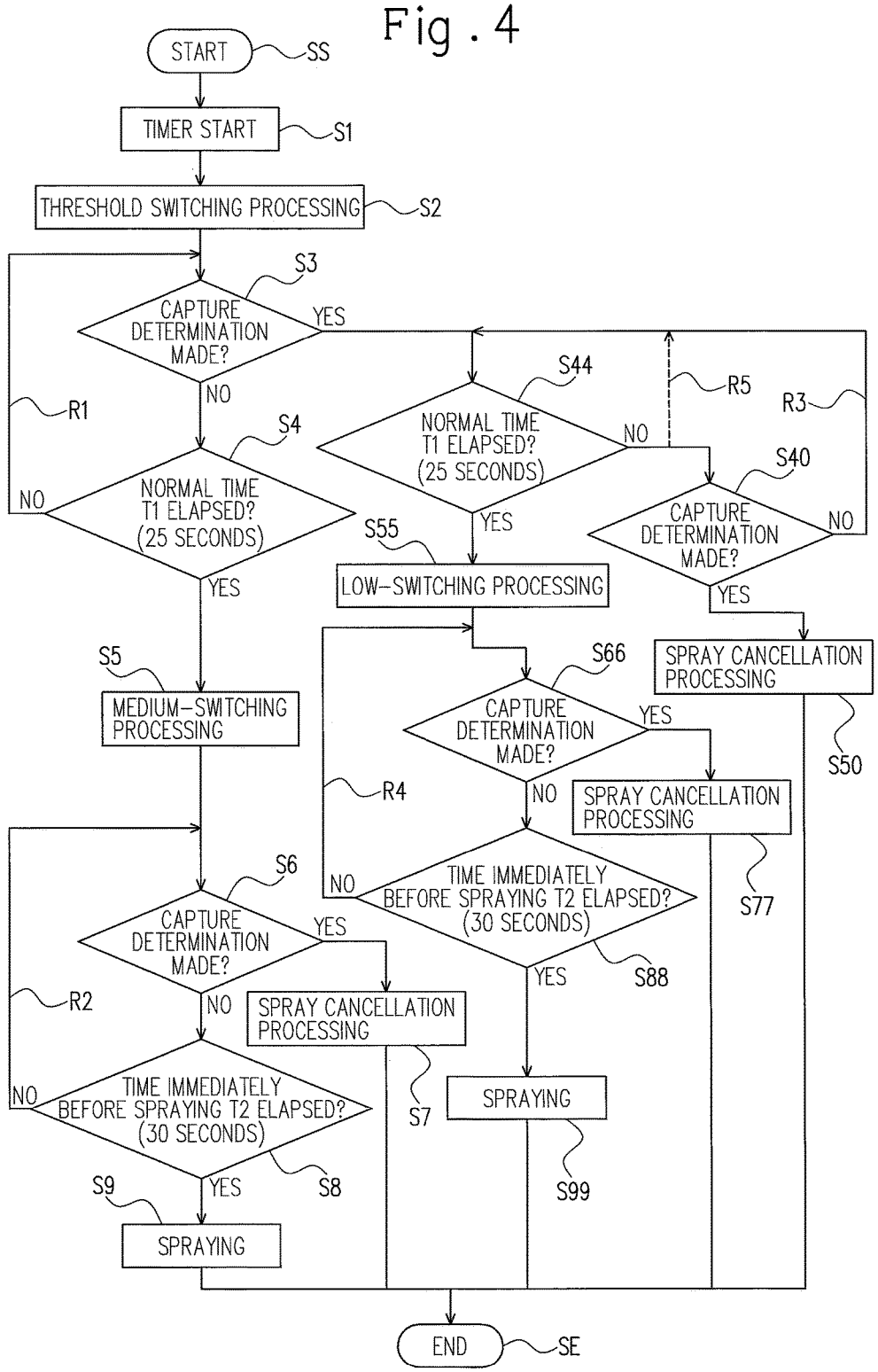
FIG. 4 is a flowchart of the spray control of the spray device according to the aforementioned embodiment.

Hereinafter, a flow of the spray control of the spray device 1 according to this embodiment will be described with reference to FIG. 4. In this embodiment, the detection determiner 81 (see FIG. 1) is configured to make a capture determination in the case where a detection signal larger than the threshold is generated once in each step.

The spray device 1 of this embodiment is controlled to periodically perform spraying. The spray device 1 of this embodiment is controlled to perform spraying for 0.1 to 2 seconds every 30 seconds. Then, when the preceding control ends, the high threshold is initially set in the detection determiner 81, and the spray 2 is independently controlled for each spray cycle.

The control of the spray 2 is started from when the power source of the spray device 1 is turned on, and the preparation of the control is completed. The control of the spray 2 is started from when the spraying is stopped, that is, when the spraying ends, in the case where the preceding control ends with the spray processing (that is, in the case where the spraying is carried out). The control of the spray 2 is started from the scheduled time to start spraying at which the spraying has been scheduled to start, in the case where the preceding control ends with the spray cancellation processing (that is, in the case where the scheduled spraying is not carried out).

When the control of the spray 2 is started (step SS), the processor 7 outputs the measurement start command to the timer 4, so that the timer 4 starts the time measurement (step S1). When the timer 4 starts the time measurement, the processor 7 commands the threshold switch 82 to set the high threshold as an initial threshold in the detection determiner 81. The threshold switch 82 performs processing to switch the threshold set in the detection determiner 81 to the high threshold (step S2).

In step S3, the detection determiner 81 determines whether or not to capture detection signals based on the high threshold. In this embodiment, the detection determiner 81 determines whether or not to capture detection signals based on the high threshold during a normal time T1 from the start of the control, while the spray 2 is in a stand-by state for the start of the spraying. When the detection determiner 81 makes a capture determination (YES in step S3), the flow proceeds to step S44, and when the detection determiner 81 makes a non-capture determination (NO in step S3), the flow proceeds to step S4. First, the flow in the case where the detection determiner 81 makes only non-capture determinations during the normal time T1 from the start of the control (step SS) (that is, in the case where all the detection signals generated during the normal time T1 from the start of the control are equal to or less than the high threshold) will be described.

In step S3, when the detection determiner 81 makes a non-capture determination (NO in step S3), whether or not the normal time T1 has elapsed from the start of the control is determined (step S4). In this embodiment, the normal time T1 is set to 25 seconds. In step S4, when it is determined that 25 seconds have not elapsed from the start of the control, the flow returns to step S3 (NO in step S4), and the detection determiner 81 determines whether or not to capture detection signals again. The detection determiner 81 repeats non-capture determinations during the lapse of 25 seconds from the start of the control, until a detection signal larger than the high threshold is generated (route R1).

When it is determined in step S4 that 25 seconds have elapsed from the start of the control (YES in step S4) while the detection determiner 81 repeats non-capture determinations (route R1), the medium-switching processing is performed, so that the threshold of the detection determiner 81 is switched from the high threshold to the medium threshold (step S5). Then, the flow proceeds to step S6.

In step S6, the detection determiner 81 determines whether or not to capture detection signals based on the medium threshold. In step S6, when the detection determiner 81 makes a non-capture determination (NO in step S6), whether or not a time immediately before spraying T2 that is a time from the start of the control to immediately before the start of the spraying has elapsed is determined (step S8). In this embodiment, the time immediately before spraying T2 is set to 30 seconds. In this way, the detection determiner 81 determines whether or not to capture detection signals based on the medium threshold for 5 seconds from the execution of the medium-switching processing (when 25 seconds have elapsed from the start of the control) to the scheduled time to start spraying (when 30 seconds have elapsed from the start of the control).

In step S8, when it is determined that 30 seconds have not elapsed from the start of the control, the flow returns to step S6 (NO in step S8), and the detection determiner 81 determines whether or not to capture detection signals again. The detection determiner 81 repeats non-capture determinations during the time from the execution of the medium-switching processing to the scheduled time to start spraying, until a detection signal larger than the medium threshold is generated (route R2).

When it is determined that 30 seconds have elapsed from the start of the control (YES in step S8) while the detection determiner 81 repeats non-capture determinations (route R2), the moving body M is regarded to be absent around the spray device 1, and the spraying is started (step S9). Then, the flow ends (step SE), and the next control starts.

In contrast, when a detection signal larger than the medium threshold is generated during the time from the execution of the medium-switching processing to the scheduled time to start spraying, so that the detection determiner 81 makes a capture determination (YES in step S6), the moving body M is regarded to be present around the spray device 1, and the spray cancellation processing is performed (step S7) to cancel the scheduled spraying. Then, the flow ends (step SE), and the next control starts.

Next, a flow in the case where a detection signal larger than the high threshold is generated during the normal time T1 from the start of the control will be described.

When the detection determiner 81 makes a capture determination in step S3 (YES in step S3), whether or not the normal time T1 (in this embodiment, 25 seconds) has elapsed from the start of the control is determined (step S44), and the threshold switch 82 prepares for the low-switching processing after the lapse of 25 seconds from the start of the control.

When it is determined that 25 seconds have not elapsed from the start of the control in step S44, the flow proceeds to step S40. In step S40, the detection determiner 81 determines whether or not to capture detection signals again based on the high threshold. When the detection determiner 81 makes a capture determination in step S40 (YES in step S40), the moving body M is regarded to be present around the spray device 1, and the spray cancellation processing is performed (step S50) to cancel the spraying. That is, when multiple capture determinations based on the high threshold are made during 25 seconds from the start of the control, the spraying is cancelled. Then, the flow ends (step SE), and the next control starts.

In contrast, when the detection determiner 81 makes a non-capture determination in step S40 (NO in step S40), the flow returns to step S44, and whether or not 25 seconds have elapsed from the start of the control is determined again. The detection determiner 81 repeats non-capture determinations during the lapse of 25 seconds from the start of the control, until a detection signal larger than the high threshold is generated (route R3).

When it is determined that 25 seconds have elapsed from the start of the control (YES in step S44) while the detection determiner 81 repeats non-capture determinations (route R3), the low-switching processing is performed, so that the threshold of the detection determiner 81 is switched from the high threshold to the low threshold (step S55). Then, the flow proceeds to step S66.

In step S66, the detection determiner 81 determines whether or not to capture detection signals based on the low threshold. When the detection determiner 81 makes a non-capture determination in step S66 (NO in step S66), whether or not the time immediately before spraying T2 (in this embodiment, 30 seconds) has elapsed from the start of the control is determined (step S88). In this way, the detection determiner 81 determines whether or not to capture detection signals based on the low threshold for 5 seconds from the execution of the low-switching processing (when 25 seconds have elapsed from the start of the control) to the scheduled time to start spraying (when 30 seconds have elapsed from the start of the control).

When it is determined that 30 seconds have not elapsed from the start of the control in step S88, the flow returns to step S66 (NO in step S88), and the detection determiner 81 determines whether or not to capture detection signals based on the low threshold again. The detection determiner 81 repeats non-capture determinations during the time from the execution of the low-switching processing to the scheduled time to start spraying, until a detection signal larger than the low threshold is generated (route R4).

When it is determined that 30 seconds have elapsed from the start of the control in step S88 while the detection determiner 81 repeats non-capture determinations (route RA), the moving body M is regarded to be absent around the spray device 1, and the spraying is started (step S99). Then, the flow ends (step SE), and the next control starts.

In contrast, when a detection signal larger than the low threshold is generated during the time from the execution of the low-switching processing to the scheduled time to start spraying, and the detection determiner 81 makes a capture determination (YES in step S66), the moving body M is regarded to be present around the spray device 1, and the spray cancellation processing is performed (step S77) to cancel the spraying. Then, the flow ends (step SE), and the next control starts.

As described above, the spray device 1 according to this embodiment includes: the spray 2 as a driver; the sensor 3 configured to detect the moving body M; and the controller 5 configured to control the spray 2 based on the detection results of the sensor 3, wherein the controller 5 includes the detection determiner 81 configured to determine whether or not to capture the detection signals from the sensor 3, a high threshold that is initially set and a low threshold that is lower than the high threshold are switchably set in the detection determiner 81 as thresholds for determining whether or not to capture detection signals, and the controller 5 is configured to: perform the spray processing to drive the spray 2 and the spray cancellation processing to cancel the driving of the spray 2; perform the low-switching processing to switch the threshold of the detection determiner 81 from the high threshold to the low threshold before the start of the spray processing, when the detection determiner 81 makes a capture determination to determine the capture of detection signals before the execution of the spray processing, based on the determination results; and perform the spray cancellation processing, when the detection determiner 81 makes a capture determination after the execution of the low-switching processing, based on the determination results.

According to the above configuration, the high threshold is initially set as the threshold of the detection determiner 81, and therefore detection signals from the sensor 3 can be captured with low detection sensitivity. Therefore, the normal detection can be limited to a necessary range, and the cancellation of spraying of the spray 2 upon unnecessary detection of the moving body M can be suppressed.

Meanwhile, when the detection determiner 81 determines the capture of detection signals in the initial state, the threshold of the detection determiner 81 is switched to the low threshold by the low-switching processing. Therefore, the detection signals from the sensor 3 can be captured with high detection sensitivity during the time from the low-switching processing to the start of the spraying, and the spraying of the spray 2 can be cancelled by the detection determinations with high accuracy.

Therefore, the spraying can be performed while unnecessary spray cancellation is suppressed through limitation of the detection to the necessary range, and once the capture of the detection signals is determined (when detection of the moving body M is determined), the spraying can be canceled upon the accurate detection. Accordingly, the spray device 1 having the above configuration improves the reliability of spraying.

In this embodiment, the controller 5 is configured to: periodically perform the spray processing; perform the spray cancellation processing on the first spraying of the spray 2 after the low-switching processing based on the determination results of the capture determination made by the detection determiner 81 after the execution of the low-switching processing; and perform the high-switching processing to switch the threshold of the detection determiner 81 from the low threshold to the high threshold after the spray cancellation processing. According to this configuration, the high-switching processing is performed after the spray cancellation processing, and therefore the spraying every specific time can be individually controlled with high reliability.

In this embodiment, the controller 5 performs the low-switching processing a specific time before the start of the spray processing and after the capture determination of the detection determiner 81 in which the high threshold is set. According to this configuration, in the time zone immediately before starting the spraying of the spray 2, signals from the sensor 3 can be captured with high detection sensitivity by making a determination based on the low threshold, so that the control can be performed with high reliability in the time zone immediately before starting the spraying of the spray 2.

In this embodiment, the controller 5 prepares for the low-switching processing in the case where the detection determiner 81 makes a capture determination before the execution of the spray processing, and performs the spray cancellation processing in the case where the detection determiner 81 further makes a capture determination during the time from the preparation to the low-switching processing. According to this configuration, the spraying can be cancelled in the case where multiple detection signals are detected for determination by the detection determiner before the spraying of the spray 2, and therefore high safety is achieved.

In this embodiment, the spray area Q of the spray 2 and the detection area P of the sensor 3 are configured to overlap each other. According to this configuration, even in the case where the moving body M approaches the spray area Q, the spraying can be cancelled upon detection of the moving body M.

In the aforementioned embodiment, determinations of whether or not to perform spraying are continuously made over the entire period from the preceding spray processing (or spray cancellation processing) to the next spray processing (or spray cancellation processing), and therefore missing of detection of the moving body M that is present in the detection area P can be prevented.

In the aforementioned embodiment, the normal time T1 and the time immediately before spraying T2 are set so that the period in which the high threshold is set is longer than the period in which the low threshold is set. Therefore, the period with low sensitivity is longer than the period with high sensitivity. Thereby, the period with high sensitivity can be prevented from being unnecessarily long, and unintended detection of the moving body M can be suppressed.

In the aforementioned embodiment, in the case where a detection signal larger than the high threshold is not generated during 25 seconds from the start of the control (YES in step S4), the threshold is switched from the high threshold to the medium threshold (step S5). Thereby, the sensitivity immediately before starting the spraying can be increased. Therefore, even in the case where the moving body M is absent around the spray device 1, the moving body M entering the detection area P immediately before the spraying can be detected by increase in the detection accuracy immediately before starting the spraying.

In the aforementioned embodiment, the detection area P extends upwardly higher than the spray area Q and expands so that the end edge of the detection area P is located outside the end edge of the spray area Q in an upper part of the detection area P. Therefore, when the moving body M such as a person comes close to the spray device 1, the moving body M enters the detection area P before entering the spray area Q. Therefore, the start of the spraying before detecting the moving body M can be prevented. Further, the distance D1 from the cover 12 to the start point S of the overlapping of the spray area Q and the detection area P is shorter than the distance D2 from the start point S to the endpoint E of the overlapping of the spray area Q and the detection area P. Therefore, the spray area Q and the detection area P overlap each other in a wide range, so that the moving body M is easily detected before starting the spraying.

In the aforementioned embodiment, the detection determiner 81 makes a capture determination in the case where a detection signal larger than the threshold is generated once in each step. Therefore, the detection determiner 81 makes a capture determination without exception when a detection signal larger than the threshold is generated, and can reliably detect the moving body M that has entered the detection area P.

In the spray device 1 of the aforementioned embodiment, the driver is the spray 2 configured to spray the spray material. According to this configuration, the spraying can be controlled with high reliability so that the moving body M that is present near the spray device 1 is not exposed to the spray material.

As can be seen from the above, this embodiment can provide a drive device that can improve the drive reliability by performing driving without exception when necessary, while unnecessary drive cancellation is suppressed, and the spray device 1 using the drive device.

The spray device 1 of the present invention is not limited to the aforementioned embodiment, and it is, of course, that various modifications can be made without departing from the gist of the present invention.

The aforementioned embodiment was described by taking, for example, the case where the drive device is used in the spray device 1, but the drive device may be used in devices other than the spray device 1. For example, the drive device may be used in hot air heaters, fan motors, deodorizers having a mechanism for generating high voltage, or the like.

The aforementioned embodiment was described by taking, for example, the case where the detection determiner 81 makes a capture determination when a detection signal larger than the threshold is generated once in each step without limitation to this. The detection determiner 81 may make a capture determination when multiple detection signals larger than the threshold are generated in each step. Specifically, in step S3, the detection determiner 81 may make a capture determination when multiple detection signals larger than the high threshold are generated, so that the flow proceeds to step S44. For example, the detection determiner 81 may make a capture determination when three detection signals larger than the high threshold are generated during the normal time T1 from the start of the control, so that the flow proceeds to step S44. The possibility that the moving body M stays within the detection area P immediately before starting the spraying is higher when a detection signal larger than the high threshold is generated three times than when a detection signal larger than the high threshold is generated once, during the normal time T1 from the start of the control, and therefore the moving body M can be detected with higher accuracy.

Further, in the aforementioned embodiment, when a detection signal larger than the high threshold is generated twice (that is, in each of step S3 and step S40, a capture determination is made when a detection signal larger than the high threshold is generated once) during the normal time T1 from the start of the control, the spraying is cancelled without switching the threshold (step S50) without limitation to this. In step S3 and step S40, the number of times at which a signal for making a capture determination is detected can be freely set. For example, a capture determination may be made in step S3 when a detection signal larger than the high threshold is generated multiple times, so that the flow proceeds to step S44 (YES in step S3), and a capture determination may be made when a detection signal larger than the high threshold is generated once (YES in step S40), so that the spraying is cancelled (step S50). Further, conversely to this, a capture determination may be made in step S3 when a detection signal larger than the high threshold is generated once, so that the flow proceeds to step S44 (YES in step S3), and a capture determination may be made when a detection signal larger than the high threshold is generated multiple times (YES in step S40), so that the spraying is cancelled (step S50). Further, a capture determination may be made when a detection signal larger than the high threshold is generated multiple times in both of step S3 and step S40.

The aforementioned embodiment was described by taking, for example, the case where the detection determiner 81 makes a capture determination when a detection signal larger than the threshold is generated once also in step S6 and step S66 without limitation to this. A capture determination may be made when a detection signal larger than the threshold is generated multiple times in step S6 and step S66, so that the spraying is cancelled.

The aforementioned embodiment was described by taking, for example, the case where whether or not to capture detection signals is determined again based on the high threshold (step S40) after the capture determination in step S3 (YES in step S3) without limitation to this. Whether or not the normal time T1 has elapsed may be determined after the capture determination in step S3 without determining whether or not to capture detection signals again (route R5 returning from step S44 with NO to step S44).

The aforementioned embodiment was described by taking, for example, the case where the threshold of the detection determiner 81 is switched from the high threshold to the medium threshold (step S5) when it is determined in step S4 that the normal time T1 has elapsed, but the switching of the threshold of the detection determiner 81 may be omitted. That is, after the lapse of the normal time T1, the flow may proceed to step S6 without performing step S5, so that the detection determiner 81 determines whether or not to capture detection signals based on the high threshold.

The aforementioned embodiment was described by taking, for example, the case where the spray device 1 is controlled to perform the spraying for 0.1 to 2 seconds every 30 seconds, and the threshold switching processing is performed after the lapse of 25 seconds from the start of the control without limitation to this. The spraying interval and spraying duration are not limited, and the timing at which the threshold switching processing is performed can be freely set. For example, the processor 7 may issue a low-switching command to the threshold switch 82 so that the threshold of the detection determiner 81 is switched from the high threshold to the low threshold (step S55), at the same time when the detection determiner 81 makes a capture determination (YES in step S3). That is, in this case, the flow may proceed to step S55 after the detection determiner 81 makes the capture determination (YES in step S3) without performing step S44, and the determination of whether or not the normal time T1 from the start of the control has elapsed may be omitted.

The aforementioned embodiment was described by taking, for example, the case where the high-threshold set period is longer than the low-threshold set period without limitation to this. The lengths of the high-threshold set period and the low-threshold set period can be freely set. Therefore, the high-threshold set period may be shorter than the low-threshold set period, and further the high-threshold set period and the low-threshold set period may have the same length.

The aforementioned embodiment was described by taking, for example, the case where the high threshold is set in the detection determiner 81 in step S2 upon the start of the control without limitation to this. In the state where the threshold of the detection determiner 81 is set to the high threshold, the control may start. That is, before the flow ends in step SE, the threshold of the detection determiner 81 may be set to the high threshold. In this case, when the timer 4 starts the time measurement after the start of the control (step SS), the detection determiner 81 may determine whether or not to capture detection signals based on the high threshold without performing step S2 (step S3).

Although not particularly mentioned in the aforementioned embodiment, in the case where the spray cycle of the spray device 1 is long, the controller 5 may turn off the power supply to the sensor 3 for a specific time. This can prevent unnecessary power consumption during the period in which the detection of the moving body M is unnecessary.

REFERENCE SIGNS LIST

1: Spray device
2: Spray
3: Detector (sensor)
4: Timer
5: Controller
6: Spray controller
7: Processor
8: Sensor controller
81: Detection determiner
82: Threshold switch
10: Body
11: Spray body
12: Cover
13: Spray opening
14: Detector opening
D1, D2: Distance
E: Endpoint
M: Moving body
P: Detection area
Q: Spray area
S: Start point
T1: Normal time
T2: Time immediately before spraying

The invention claimed is:

1. A drive device for spraying a material, comprising:
a driver configured to spray a spray material;
a detector configured to detect a moving body; and
a controller configured to control the driver based on detection results of the detector, wherein
the controller comprises a detection determiner configured to determine whether or not to capture detection signals from the detector,
a high threshold that is initially set and a low threshold that is lower than the high threshold are switchably set in the detection determiner as thresholds for determining whether or not to capture the detection signals, and
the controller is configured to:
perform drive processing to drive the driver and drive cancellation processing to cancel driving of the driver;
perform, when the detection determiner makes a capture determination to determine the capture of the detection signals before executing the drive processing, low-switching processing to switch the threshold of the detection determiner from the high threshold to the low threshold before start of the drive processing based on the determination results; and
perform, when the detection determiner makes a capture determination after execution of the low-switching processing, the drive cancellation processing based on the determination results.

2. The drive device according to claim 1, wherein the controller is configured to:
periodically perform the drive processing;
perform the drive cancellation processing on a first driving of the driver after the low-switching processing based on the determination results of the capture determination made by the detection determiner after the execution of the low-switching processing; and
perform high-switching processing to switch the threshold of the detection determiner from the low threshold to the high threshold after the drive cancellation processing.

3. The drive device according to claim 1, wherein the controller is configured to perform the low-switching processing a specific time before the start of the drive processing and after the capture determination of the detection determiner in which the high threshold is set.

4. The drive device according to claim 1, wherein the controller is configured to:

prepare for the low-switching processing in a case where the detection determiner makes a capture determination before executing the drive processing; and perform the drive cancellation processing in a case where the detection determiner further makes a capture determination during the time from the preparation to the low-switching processing.

5. A spray device using the drive device according to claim 1, wherein a spray area of the spray and a detection area of the detector are configured to overlap each other.

* * * * *